US010358084B2

(12) United States Patent
Salter et al.

(10) Patent No.: US 10,358,084 B2
(45) Date of Patent: Jul. 23, 2019

(54) MOON ROOF WITH INTEGRATED AMBIENT LIGHTING

(71) Applicant: Ford Global Technologies, LLC, Dearborn, MI (US)

(72) Inventors: Stuart C. Salter, White Lake, MI (US); Adrian Nania, Rochester, MI (US); Satyanarayana Raju Vemulapati, Westland, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/806,726

(22) Filed: Nov. 8, 2017

(65) Prior Publication Data

US 2019/0135170 A1    May 9, 2019

(51) Int. Cl.

| B60Q 3/208 | (2017.01) |
| B60Q 3/60 | (2017.01) |
| B60Q 3/80 | (2017.01) |
| B60Q 3/54 | (2017.01) |
| B60J 7/043 | (2006.01) |
| B60Q 3/74 | (2017.01) |
| F21V 7/04 | (2006.01) |
| H05B 33/08 | (2006.01) |
| B60J 7/00 | (2006.01) |
| F21Y 115/10 | (2016.01) |

(52) U.S. Cl.
CPC .............. *B60Q 3/208* (2017.02); *B60J 7/003* (2013.01); *B60J 7/043* (2013.01); *B60Q 3/54* (2017.02); *B60Q 3/60* (2017.02); *B60Q 3/74* (2017.02); *B60Q 3/80* (2017.02); *F21V 7/04* (2013.01); *H05B 33/0845* (2013.01); *H05B 33/0863* (2013.01); *F21Y 2115/10* (2016.08)

(58) Field of Classification Search
CPC ...... B60Q 3/208; B60Q 3/64; B60Q 2500/10; B60Q 3/004; B60Q 3/0213; B60Q 3/54; B60Q 3/745; B60Q 3/0283; B60Q 3/74; B60Q 3/78; B60Q 3/80
See application file for complete search history.

(56) References Cited

U.S. PATENT DOCUMENTS 7,967,486 B2   6/2011  Ludwig et al.
8,882,318 B2  11/2014  Pfeil et al.
(Continued)

FOREIGN PATENT DOCUMENTS

DE    10204359 B4   5/2005
DE    10320614 B4   1/2006
(Continued)

OTHER PUBLICATIONS

Moonroof Korea—Moonline multi color LED light, Sep. 5, 2013, https://www.youtube.com/watch?v=KWgz0hbe6TU.
(Continued)

*Primary Examiner* — Monica C King
(74) *Attorney, Agent, or Firm* — Carlson, Gaskey & Olds, P.C.

(57) ABSTRACT

A lighting system for a vehicle cabin is discloses and includes a light directing conduit disposed about at least a portion of an opening through a vehicle roof. A pin spot uses light from the light directing conduit for localized lighting within the vehicle interior.

19 Claims, 4 Drawing Sheets

(56) References Cited

U.S. PATENT DOCUMENTS 9,834,073 B1 *  12/2017  Torres Olvera .......... B60J 7/003
2009/0251917 A1  10/2009  Wollner et al.

FOREIGN PATENT DOCUMENTS

DE   102005034757 A1   2/2007
JP      2007131117 A   5/2007
WO     2012/103984 A1  8/2012

OTHER PUBLICATIONS

The New Volkswagen Tiguan, https://www.vertuvolkswagen.com/new-volkswagen-tiguan/, retrieved Sep. 7, 2017.

* cited by examiner

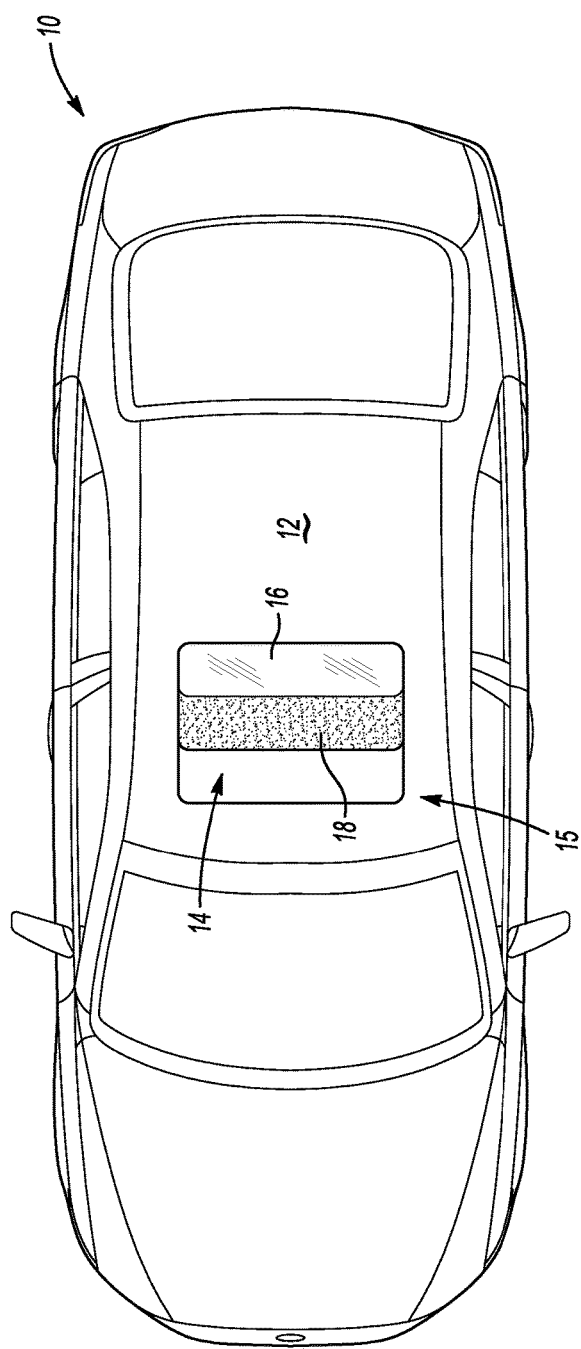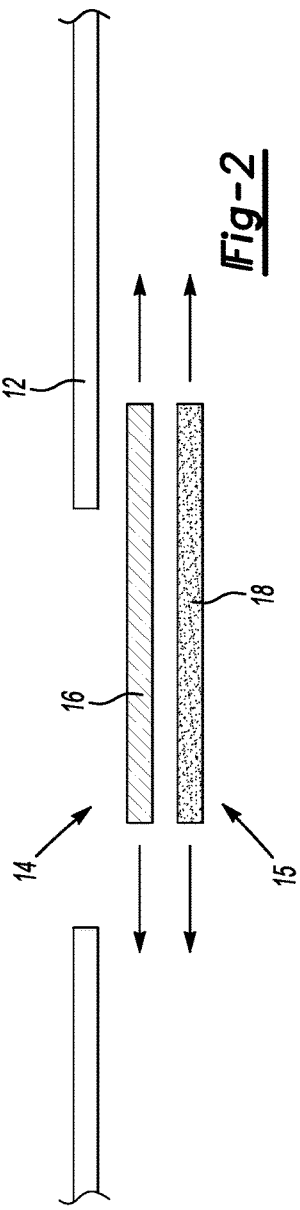

MOON ROOF WITH INTEGRATED AMBIENT LIGHTING

TECHNICAL FIELD

This disclosure relates to a vehicle interior lighting system surrounding a moon roof and a method of operating the lighting system.

BACKGROUND

Vehicles may include an opening within the roof structure with a movable closure panel. The opening and closure panel are often referred to as a moon roof. The moon roof is openable to different positions to provide ventilation and to completely expose the opening. Lighting around the opening is sometimes included to provide additional interior lighting and to provide a desired aesthetic appearance. The interior lighting may also include spot lighting to provide a desired aesthetic appearance and also to provide light where needed to aid ingress and egress from the vehicle. Each additional lighting feature within a vehicle incurs costs both in physical parts and assembly time.

SUMMARY

A lighting system for a vehicle cabin according to an exemplary aspect of the present disclosure includes, among other things, a light directing conduit disposed about at least a portion of an opening through a vehicle roof. A pin spot is in communication with the light directing conduit. The pin spot directs light from the light directing conduit away from the opening.

In a further non-limiting embodiment of the foregoing lighting system, the light directing conduit includes an optical structure for directing light toward the pin spot.

In a further non-limiting embodiment of any of the foregoing lighting systems, a channel includes a slot facing the opening and the light directing conduit supported within the channel and directing light through the slot toward the opening.

In a further non-limiting embodiment of any of the foregoing lighting systems, the channel includes a pin spot opening extending transverse to the slot within which a portion of a pin spot tube is disposed.

In a further non-limiting embodiment of any of the foregoing lighting systems, a headliner portion defines an interior surface of roof of the vehicle about the opening through the vehicle roof. The headliner portion includes a headliner opening receiving the pin spot tube and a pin spot bezel.

In a further non-limiting embodiment of any of the foregoing lighting systems, the pin spot includes a plurality of pin spots disposed about the opening through the vehicle roof with each of the plurality of pin spots in communication with the light directing conduit for directing light away from the opening.

In a further non-limiting embodiment of any of the foregoing lighting systems, at least one light source is disposed at an end of the light directing conduit.

In a further non-limiting embodiment of any of the foregoing lighting systems, a controller governs operation of the at least one light source responsive to a position of at least one of a closure panel and shade movable over the opening in the vehicle roof.

In a further non-limiting embodiment of any of the foregoing lighting systems, the controller decreases an intensity of light directed into the light directing conduit responsive to the shade being in an open position and the closure panel being in a closed position.

In a further non-limiting embodiment of any of the foregoing lighting systems, the controller increases an intensity of light directed into the light directing conduit responsive to the shade and the closure panel being in an open position.

A lighting system for a vehicle cabin according to an exemplary aspect of the present disclosure includes, among other things, a light directing conduit disposed about at least a portion of an opening through a vehicle roof. At least one light source is disposed at an end of the light directing conduit. A controller governs operation of the at least one light source responsive to a position of at least one of a closure panel and shade movable over the opening in the vehicle roof.

In a further non-limiting embodiment of any of the foregoing lighting systems, the controller decreases an intensity of light directed into the light directing conduit responsive to the shade being in an open position and the closure panel being in a closed position.

In a further non-limiting embodiment of any of the foregoing lighting systems, the controller increases an intensity of light directed into the light directing conduit responsive to the shade and the closure panel being in an open position.

In a further non-limiting embodiment of any of the foregoing lighting systems, a controller adjusts at least one light characteristic responsive to a position at least one of a shade, a closure panel and a color of a headliner surrounding the opening through the vehicle roof.

In a further non-limiting embodiment of any of the foregoing lighting systems, the controller adjusts a color emitted by the at least one light source responsive to a determination that at least one of the closure panel and shade is moving.

A method of operating a lighting system for a vehicle cabin according to another exemplary aspect of the present disclosure includes, among other things, directing light from a light source through at least one light directing conduit disposed about at least a portion of an opening through a vehicle roof. A characteristic of the light being directed through the light directing conduit varies with a controller responsive to a sensed position of at least one of a closure panel and shade movable over the opening in the vehicle roof.

In a further non-limiting embodiment of the foregoing method, the controller decreases an intensity of light directed into the light directing conduit responsive to the shade being in an open position and the closure panel being in a closed position.

In a further non-limiting embodiment of any of the foregoing methods, the controller increases an intensity of light directed into the light directing conduit responsive to the shade and the closure panel being in an open position.

In a further non-limiting embodiment of any of the foregoing methods, the light characteristic responsive to a color of a headliner surrounding the opening varies through the vehicle roof.

In a further non-limiting embodiment of any of the foregoing methods, a color of light emitted into the light directing conduit responsive movement of one of the shade and the closure panel varies.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 1 is a top schematic view of a vehicle including an example moon roof embodiment.

FIG. 2 is a schematic side view of an example moon roof embodiment.

DETAILED DESCRIPTION

Figure 3:
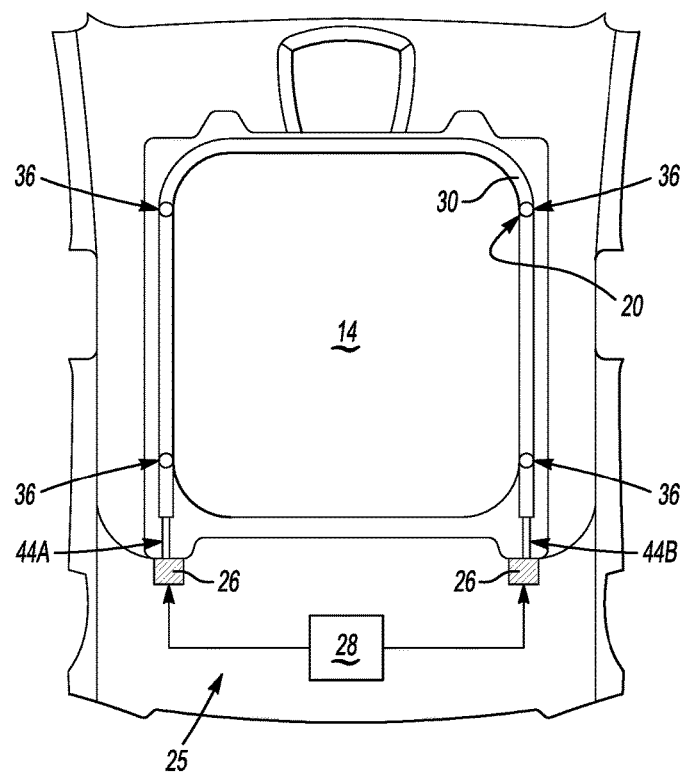
FIG. 3 is a view of the example moon roof and an example lighting system embodiment looking upward from the interior of the vehicle.

Referring to FIGS. 1 and 2, an example vehicle 10 includes a roof 12 with an opening 14 and closure panel 16 commonly referred to as a moon roof 15. The moon roof 15 includes the closure panel 16 and a shade 18 that are movable independently relative to the opening 14 through various different covering positions.

Referring to FIG. 3 with continued reference to FIGS. 1 and 2, a lighting system 25 that is disposed about a perimeter 20 of the opening 14. The example lighting system 25 includes a light directing conduit 24 disposed along at least three sides of the perimeter 20. The light directing conduit 24 includes ends 44A-B that are disposed proximate light sources 26. The light sources 26 are LED assemblies that can provide light at varying intensities and colors. Although the light sources 26 are disclosed by way of example as LED's, other light sources may be used and are within the contemplation of this disclosure.

A controller 28 is shown schematically for controlling operation of the light sources 26. The controller 28 may be a dedicated controller for the lighting system 25, part of the vehicle controller or other systems within the vehicle. Moreover, the location of the controller 28 is shown schematically and may be disposed in other locations within the vehicle.

The light directing conduit 24 is disposed within a channel 30 that extends about the three sides of the opening 14 proximate the perimeter 20. A pin spot 36 is a light that provides a focused light beam within the interior of the vehicle. The example lighting system 25 includes a pin spot 36 at four locations about the perimeter 20 of the opening 14. Each of the pin spots 36 are in communication with the light directing conduit 24 such that light that is directed through the light directing conduit 24 is also directed to each of the pin spots 36. In this way, light emitted into the light directing conduit 24 is also utilized for both perimeter lighting and for each of the pin spots 36.

Figure 4:
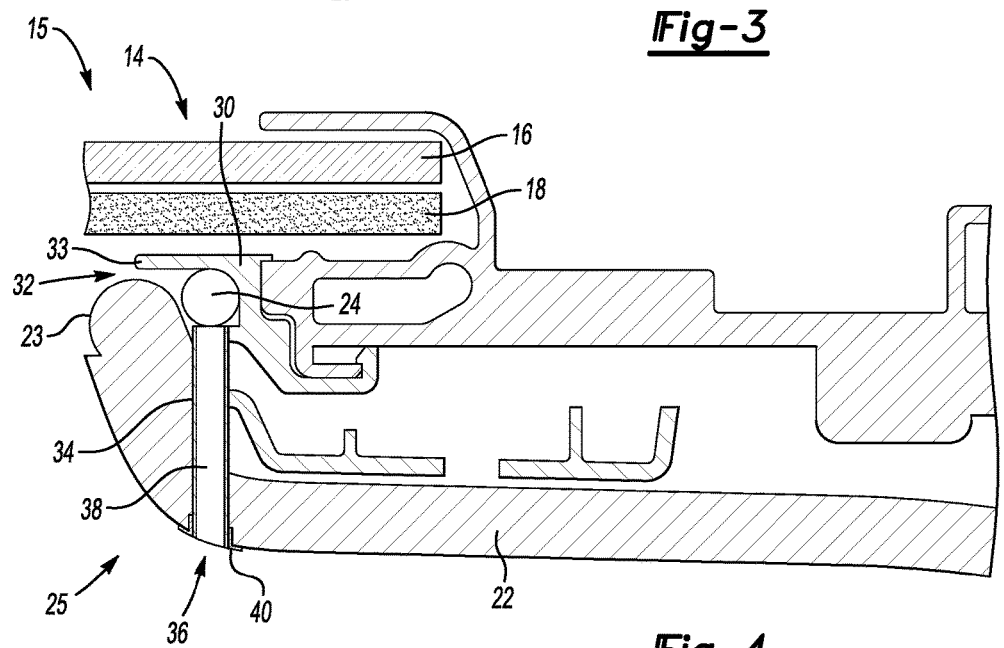
FIG. 4 is a cross-section of an example lighting system embodiment.

Referring to FIG. 4 with continued reference to FIG. 3, a portion of the example lighting assembly 25 is schematically shown and includes the channel 30 supporting the light directing conduit 24 proximate the perimeter 20. A headliner 22 is supported about the perimeter 20 near the channel 30. A slot 32 is provided between the channel 30 and an end 23 of the headliner 22. The slot 32 is shown in cross-section and extends about at least three sides of the perimeter 20. The slot 32 may be continuous and uninterrupted, or may be segmented to accommodate fastening of the headliner 22 near the perimeter 20. Light emitted from the light directing conduit 24 is visible through the slot to provide an illuminated boarder about the moon roof 15.

The channel 30 is provided about the perimeter 20 and supports the light directing conduit 24. The channel 30 may be one single part or several parts attached to support the light directing conduit 24. Moreover, the channel 30 blocks portions of light from the light directing conduit 24 such that light is only visible through the slot 32. The example light directing conduit 24 is a flexible light tube that emits light about its entire circumference for its entire length. The diameter, length and overall size of the light directing conduit 24 may vary depending on available space, the light sources utilized and the characteristics of light desired to be emitted through the slot 24. Moreover, while a disclosed embodiment of the light directing conduit 24 includes a light pipe, other lighting structures could be utilized and are within the contemplation of this disclosure.

The light directing conduit 24 receives light at each end 44A-B from the light sources 26 as is shown in FIG. 3. Light radiating outward from the light directing conduit 24 is visible only through the slot 32 between the headliner end 23 and a top portion 33 of the channel 30.

The pin spot 36 is disposed at specific discreet locations as is shown in the example embodiment illustrated in FIG. 3. Each pin spot 36 includes a tube 38 in communication with the light directing conduit 24. A bezel 40 is provided at an end of the tube 38 to define an exposed end and provide the desired aesthetic appearance that corresponds with the color and texture of the headliner 22. The headline 22 includes a specific color and texture that is matched by the bezel 40.

Figure 5:
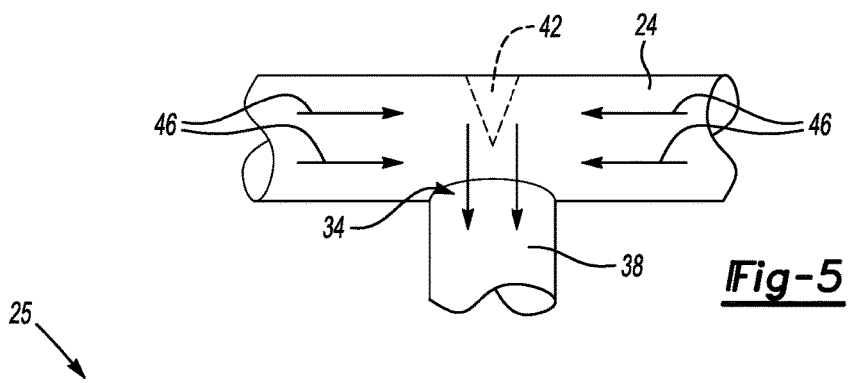
FIG. 5 is a cross-section of a portion of the example lighting system.

Referring to FIG. 5 with continued reference to FIG. 4, the example light directing conduit 24 includes openings 34 at the location of each of the pin spots 36. The openings 34 communicate light, schematically shown at 46, into tubes 38 of each pin spot 36. As appreciated, a significant amount of light is not utilized by the light directing conduit 24. Only a small amount of light is visible through the slot 32. Light directed into each of the pin spots 36 does not require additional light sources or control structures. Instead, the light and control of the light in the pin spots 36 is provided by the existing sources 26 and controller 28 that direct light into the light directing conduit 24.

An optical structure 42 may be provided at locations where the pin spot tube 38 intersects the light conducting conduit 24 to enhance the direction of light transmission transversely into the tube 38. Accordingly, a portion of light 46 communicated through the light directing conduit 24 is redirected by the optical structure 42 into the tube 38 to provide the desired pin spot 36. The example optical structure 42 is schematically illustrated as a prism that directs light transverse to the direction of the light conducting conduit 24. The optical structure 42 may be other shapes, structures and configurations that are known to direct light transversely into the tube 38. The tube 38 may include a reflective interior surface and a coating on an exterior surface to prevent undesired light leakage in undesired directions. Moreover, while an opening 34 is shown between the tube 38 and the light directing conduit 24, other means of transmitting light may be utilized. Instead of an opening 34, the tube 38 may simply abut the light directing conduit 24 and receive light transmitted through the circumference in a similar matter as is provided through the slot 32.

Figure 6:
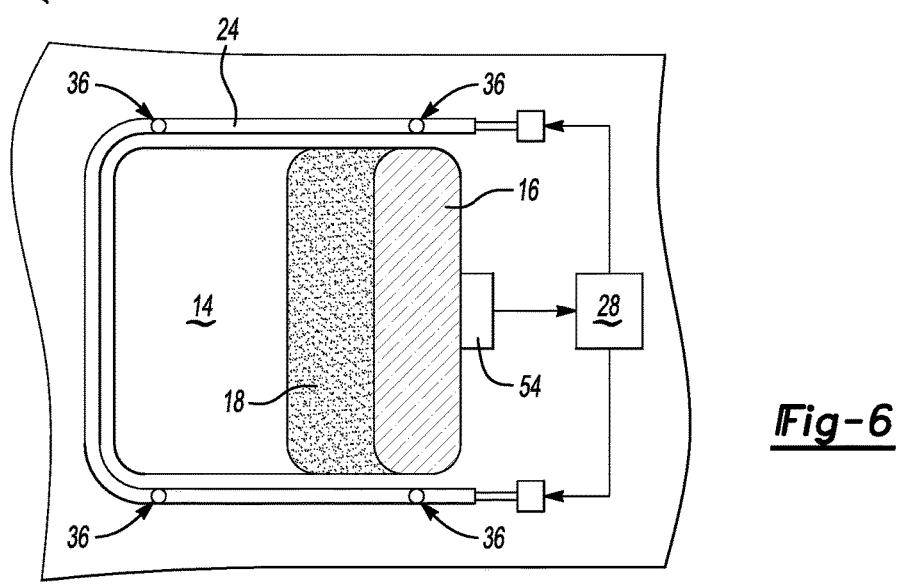
FIG. 6 is a schematic view of the example lighting system for the moon roof.

Referring to FIG. 6 with continued reference to FIGS. 4 and 5, the example lighting system 25 is schematically illustrated and includes the light conducting conduit 24 that extends about three sides of the opening 14. The closure panel 16 and shade 18 are movable relative to the opening 14. At each pin spot location 36, light transmitted along the length of the light directing conduit 24 is directed transversely downward into interior of the vehicle to provide the desired pin spot 36.

Although four pin spots 36 are shown and described by way of example, greater or lesser numbers of pin spots 36 could be provided and are within the contemplation of this disclosure. In the disclosed example, each of the pin spots 36 are located to illuminate the interior near a door to aid in ingress and egress of passengers within the vehicle cabin. The pin spots 36 however may be located in any location. The incorporation of the pin spots 36 with the light conducting conduit 24 utilizes light that is otherwise wasted and incorporates the separate pin spot structures into a common structure to provide an integral interior lighting system 25.

Figure 7:
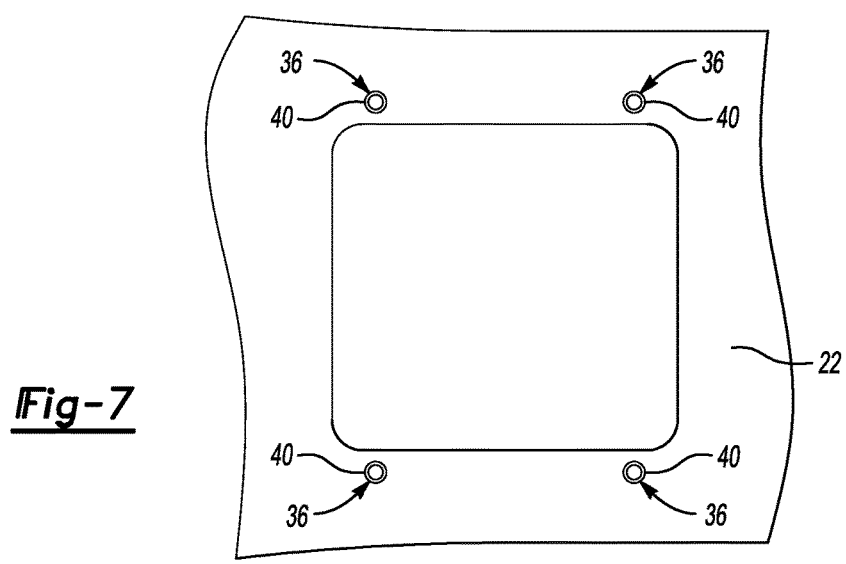
FIG. 7 is a view of the example lighting system looking upward from the interior of the vehicle including the head liner and pin spot lighting.

Referring to FIG. 7 with continued reference to FIG. 6, the headliner 22 is shown about the opening 14 and includes the bezels 40 that indicate the location of each of the pin spots 36. The bezels 40 include aesthetic features that match the headliner 22 and provide a desired aesthetic appearance within the vehicle cabin.

The example lighting system 25 is further operated by the controller 28 to account for structures surrounding the light directing conduit 24. Colors and textures of material within the vehicle interior as well as the closure panel 16 and shade 18 affect the perceived color and intensity of light emitted through the slot 32. Moreover, the position of the closure panel 16 and shade 16 affect the perceived light intensity with the vehicle cabin. The example controller 28 receives information from a sensor 54 indicative of a position of the closure panel 16 and shade 18. The sensor 54 may be one sensor or several sensors providing information to the controller 28 that indicates the position of the closure panel 16 and shade 18.

Figure 8:
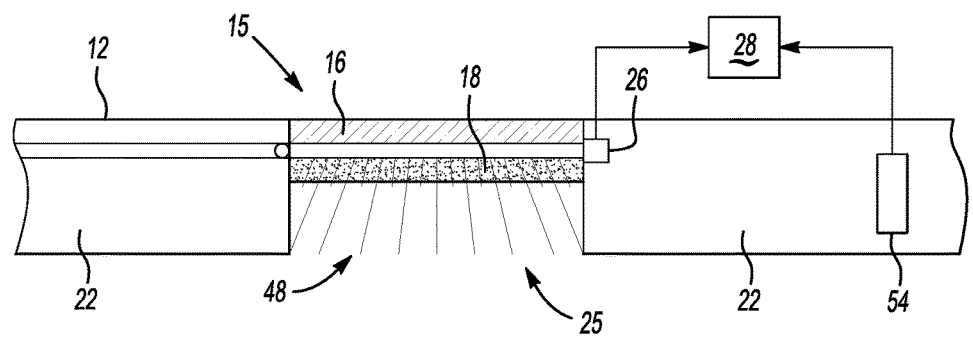
FIG. 8 is a schematic view of the lighting system with a closure panel and sun shade in a closed position.

Referring to FIG. 8, the controller 28 controls characteristics of light directed through the light directing conduit 24 to accommodate differences in how light is reflected off the structures surrounding the moon roof 15. The shade 18 and enclosure panels 16 provide different reflective surfaces and light absorption characteristics in conjunction with light transmitted through the light directing conduit 24.

In this example, the closure panel 16 is a glass panel and is therefore highly reflective. The shade 18 is a fabric panel and absorbs light. With both the closure panel 16 and shade 18 in a closed position light will be absorbed by the shade 18 and the surrounding headliner 22. The controller 28 adjusts the intensity of light transmitted through the light directing conduit 24 to provide a desired overall light intensity as is schematically indicated by arrow 48. Note that the arrows 48 indicate the light transmitted through the light directing conduit 24, not the actual perceived light. The perceived light would remain constant throughout the various adjustments made by the controller 28. The changes in light intensity by the controller 28 provide for a perceived uniform and consistent light. The controller 28 receives information from a sensor 54 regarding a position of both the closure panel 16 and shade 18. With this information, the controller 28 varies an intensity of light directed through the light conduit to provide an overall desired lighting appearance as is indicated at 48. In this example, the intensity of light indicated at 48 is increased over other positions to compensate for light absorption of the shade 18 and headliner 22.

Figure 9:
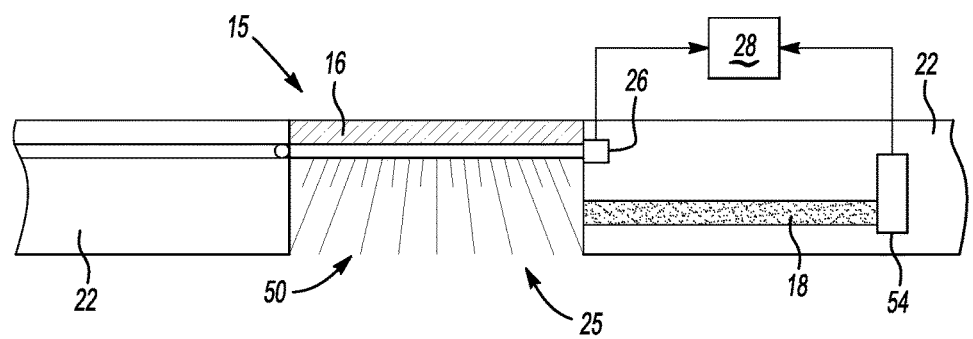
FIG. 9 is a schematic view of the example lighting system with the closure panel in a closed position and the shade in an open position.

Referring to FIG. 9, the shade 18 is in an open position and the closure panel 16 is in a closed position. In this configuration, the closure panel 16 provides a highly reflective surface and therefore the controller 28 can reduce intensity of light directed through the light conduit 24 as is shown schematically at 50. The lower intensity light does not result in an overall decrease in the actual amount of perceived light emitted into the vehicle cabin due to the reflective nature of the closure panel 16.

Figure 10:
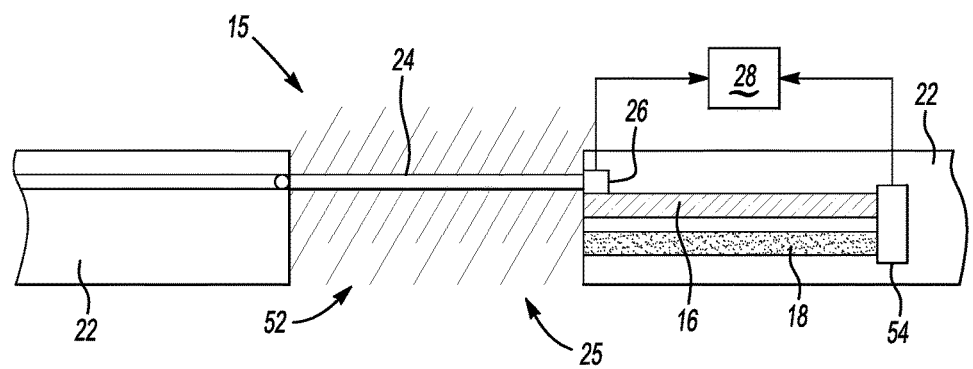
FIG. 10 is a schematic view of the example lighting system with the closure panel and sun shade in an open position.

Referring to FIG. 10, the example controller 28 increases the intensity of light transmitted through light conducting conduit 24 when both the shade 18 and enclosure panel 16 are in an open position. The increase in light through the light conduit 24 provides an overall appearance within the vehicle cabin that is desired and also accommodates for the lack of any reflective surfaces provided by the closure panel 16. A drastic increase in emitted light as indicated by 52 is provided because there are no reflective surfaces that aid in increasing the intensity of lighting. However, as noted, the increase in emitted light indicated at 52 does not increase the perceived light. Instead the increase in emitted light provides for a uniform appearance. Moreover, the increase in light intensity provides increased visibility from outside the vehicle to use it as part of the aesthetic appearance of the vehicle cabin and the overall vehicle structure.

Moreover, the controller 28 may also adjust the relative quantity of each light frequency in the visible spectrum produced by the light sources 26 to compensate for unequal absorption of different light frequencies. A tan colored headliner may absorb more of a specific light frequency, such as those frequencies that correspond with blue. The controller 28 controls the light sources to increase the relative amount of blue light as needed to provide the desired perceived color visible around the perimeter 20. A black headliner may absorb all light frequencies equally and therefore the controller 28 increases the overall intensity to compensate for the increased absorption. The controller 28 is programmed based on the known colors, textures and within the vehicle and controls light production from the light sources 26 based on the vehicle specific combinations.

The example lighting system also provides specific lighting conditions depending on a movement of the closure panel 18 and shade 16. The controller 28 can change the color of light transmitted through the light conduit 24 to indicate specific conditions of the moon roof 15. For example, in one condition, the light through the light conducting conduit 24 is changed to a green color when the closure panel 16 is moving to an open position. The changing color provides a visual confirmation of operation of the moon roof 15. The controller 28 adjusts the color of light through the light directing conduit 24 to red when the closure panel 16 is moving to a closed position to provide a visual confirmation of movement to the closed position and also to warn the user that the opening is closing and therefore to keep away from the moon roof as it is moving to the closed position.

Accordingly, the example lighting system 25 surrounding the moon roof 15 provides specific features that increase the use of light and accommodate different interior environments while also providing visual confirmation of operation.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A lighting system for a vehicle cabin comprising:
    a light directing conduit disposed about at least a portion of an opening through a vehicle roof;
    at least one light source disposed at an end of the light directing conduit; and
    a pin spot in communication with the light directing conduit, the pin spot directing light from the light directing conduit away from the opening.

2. The lighting system as recited in claim 1, wherein the light directing conduit includes an optical structure for directing light toward the pin spot.

3. The lighting system as recited in claim 1, including a channel including a slot facing the opening and the light directing conduit supported within the channel and directing light through the slot toward the opening.

4. The lighting system as recited in claim 3, wherein the channel includes a pin spot opening extending transverse to the slot within which a portion of a pin spot tube is disposed.

5. The lighting system as recited in claim 4, including a headliner portion defining an interior surface of roof of the vehicle about the opening through the vehicle roof, the headliner portion including a headliner opening receiving the pin spot tube and a pin spot bezel.

6. The lighting system as recited in claim 1, wherein the pin spot includes a plurality of pin spots disposed about the opening through the vehicle roof with each of the plurality of pin spots in communication with the light directing conduit for directing light away from the opening.

7. The lighting system as recited in claim 6, including a controller governing operation of the at least one light source responsive to a position of at least one of a closure panel and shade movable over the opening in the vehicle roof.

8. The lighting system as recited in claim 7, wherein the controller decreases an intensity of light directed into the light directing conduit responsive to the shade being in an open position and the closure panel being in a closed position.

9. The lighting system as recited in claim 8, wherein the controller increases an intensity of light directed into the light directing conduit responsive to the shade and the closure panel being in an open position.

10. A lighting system for a vehicle cabin comprising:
    a light directing conduit disposed about at least a portion of an opening through a vehicle roof;
    at least one light source disposed at an end of the light directing conduit; and
    a controller governing operation of the at least one light source responsive to a position of at least one of a closure panel and shade movable over the opening in the vehicle roof.

11. The lighting system as recited in claim 10, wherein the controller decreases an intensity of light directed into the light directing conduit responsive to the shade being in an open position and the closure panel being in a closed position.

12. The lighting system as recited in claim 10, wherein the controller increases an intensity of light directed into the light directing conduit responsive to the shade and the closure panel being in an open position.

13. The lighting system as recited in claim 10, including a controller adjusting at least one light characteristic responsive to a position at least one of a shade, a closure panel and a color of a headliner surrounding the opening through the vehicle roof.

14. The lighting system as recited in claim 10, wherein the controller adjusts a color emitted by the at least one light source responsive to a determination that at least one of the closure panel and shade is moving.

15. A method of operating a lighting system for a vehicle cabin comprising:
    directing light from a light source through at least one light directing conduit disposed about at least a portion of an opening through a vehicle roof; and
    varying a characteristic of the light being directed through the light directing conduit with a controller responsive to a sensed position of at least one of a closure panel and shade movable over the opening in the vehicle roof.

16. The method of operating a lighting system as recited in claim 15, wherein the controller decreases an intensity of light directed into the light directing conduit responsive to the shade being in an open position and the closure panel being in a closed position.

17. The method of operating a lighting system as recited in claim 15, wherein the controller increases an intensity of light directed into the light directing conduit responsive to the shade and the closure panel being in an open position.

18. The method of operating a lighting system as recited in claim 15, including varying the light characteristic responsive to a color of a headliner surrounding the opening through the vehicle roof.

19. The method of operating a lighting system as recited in claim 15, including varying a color of light emitted into the light directing conduit responsive movement of one of the shade and the closure panel.

* * * * *